United States Patent
Morimura et al.

(10) Patent No.: US 6,714,666 B1
(45) Date of Patent: Mar. 30, 2004

(54) SURFACE SHAPE RECOGNITION APPARATUS

(75) Inventors: Hiroki Morimura, Kanagawa (JP); Satoshi Shigematsu, Kanagawa (JP); Katsuyuki Machida, Kanagawa (JP); Hakaru Kyuragi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 620 days.

(21) Appl. No.: 09/590,879

(22) Filed: Jun. 9, 2000

(30) Foreign Application Priority Data

Jun. 10, 1999 (JP) ............................. 11-163559
Mar. 10, 2000 (JP) ........................ 2000-066098

(51) Int. Cl.[7] .................. G06K 9/00; G09G 5/00; H04K 1/00
(52) U.S. Cl. ................ 382/124; 382/115; 345/174; 340/5.52; 340/5.53; 713/186
(58) Field of Search .............. 382/115–127; 356/71; 345/173–174; 257/415–416, 432, 434, 448, 459, 534; 283/68; 340/5.52, 5.53, 5.82, 5.83; 713/186; 902/3

(56) References Cited

U.S. PATENT DOCUMENTS

| | | | | |
|---|---|---|---|---|
| 5,366,908 A | * | 11/1994 | Pelella | 438/207 |
| 5,757,278 A | * | 5/1998 | Itsumi | 340/5.83 |
| 5,862,248 A | * | 1/1999 | Salatino et al. | 382/124 |
| 5,956,415 A | * | 9/1999 | McCalley et al. | 382/124 |
| 5,963,679 A | * | 10/1999 | Setlak | 382/312 |
| 5,973,623 A | * | 10/1999 | Gupta et al. | 341/33 |
| 5,991,467 A | * | 11/1999 | Kamiko | 382/312 |
| 6,002,786 A | * | 12/1999 | Hallibert et al. | 382/124 |
| 6,011,859 A | * | 1/2000 | Kalnitsky et al. | 382/124 |
| 6,060,756 A | * | 5/2000 | Machida et al. | 257/415 |
| 6,114,862 A | * | 9/2000 | Tartagni et al. | 324/662 |
| 6,248,655 B1 | * | 6/2001 | Machida et al. | 438/597 |
| 6,438,257 B1 | * | 8/2002 | Morimura et al. | 382/124 |
| 6,440,814 B1 | * | 8/2002 | Lepert et al. | 438/393 |
| 6,518,083 B2 | * | 2/2003 | Sato et al. | 438/50 |
| 6,555,888 B2 | * | 4/2003 | Lepert et al. | 257/415 |
| 6,628,812 B1 | * | 9/2003 | Setlak et al. | 382/124 |

FOREIGN PATENT DOCUMENTS

| | | |
|---|---|---|
| EP | 0 789 334 A | 8/1997 |
| JP | KOKAI 61-221883 | 10/1986 |
| JP | 4-231803 | 8/1992 |
| JP | KOKAI 5-061965 | 3/1993 |
| JP | KOKAI 7-168930 | 7/1995 |
| JP | 10-261670 | 9/1998 |
| JP | 11-318864 | 11/1999 |
| WO | WO 94 05042 A | 3/1994 |

OTHER PUBLICATIONS

"A Study on the Structure of a Smart Card with the Function to Verify the Holder", Technical Report of IEICE, OFS92–32, pp. 25–30 (1992).

"A 390dpi Live Fingerprint Imager Based on Feedback Capacitive Sensing Sheme" 1997 IEEE International Solid-State Circuits Conference, pp. 200–201 (1997).

"ISSCC Digest Of Technical Papers" Feb. 1998 pp. 284–285.

* cited by examiner

*Primary Examiner*—Jayanti K. Patel
*Assistant Examiner*—Aaron Carter
(74) *Attorney, Agent, or Firm*—Blakely, Sokoloff, Taylor & Zafman

(57) ABSTRACT

A surface shape recognition apparatus includes a plurality of sensor electrodes, passivation film, capacitance detection circuit, and ground electrode. The sensor electrodes are formed on an interlevel insulator on a substrate and insulated from each other. The passivation film is formed on the interlevel insulator to cover the upper and side surfaces of each sensor electrode. The passivation film is formed from a dielectric material. When a target recognition object comes into contact with the surface of the passivation film, the capacitance detection circuit detects an electrostatic capacitance formed between the sensor electrode and the surface of the target recognition object opposing the sensor electrode. The ground electrode passes static electricity on the surface of the passivation film.

6 Claims, 7 Drawing Sheets

SURFACE SHAPE RECOGNITION APPARATUS

BACKGROUND OF THE INVENTION

The present invention relates to a surface shape recognition apparatus and, more particularly, to a surface shape recognition apparatus for recognizing the small surface shape pattern of a human finger or animal nose.

In the social environment of today where the information-oriented society is developing, the security technology has taken a growing interest. For example, in the information-oriented society, a personal authentication technology for constructing an electronic money system is an important key. In fact, authentication technologies for implementing preventive measures against burglary and illicit use of cards are under active research and development (for example, Yoshimasa Shimizu, "A Study on the Structure of a Smart Card with the Function to Verify the Holder", Technical Report of IEICE, OFS92—32, pp. 25–30, (1992)).

Such authentication techniques include various schemes using a fingerprint or voiceprint. Especially, many fingerprint authentication techniques have been developed. Fingerprint authentication schemes are roughly classified into optical read schemes and schemes of converting the three-dimensional pattern on the skin surface of a fingertip into an electrical signal using human electrical characteristics and outputting the electrical signal.

In an optical read scheme, a fingerprint is received as optical image data mainly using light reflection and a CCD images sensor and collated (Japanese Patent Laid-Open No. 61-221883).

Another scheme has also been developed, in which a piezoelectric thin film is used to read the pressure difference on a finger skin surface (Japanese Patent Laid-Open No. 5-61965). As a scheme of converting a change in electrical characteristics due to contact of skin into an electrical signal distribution to detect the shape of fingerprint, an authentication scheme of detecting a resistance or capacitance change amount using a pressure sensitive sheet has been proposed (Japanese Patent Laid-Open No. 7-168930).

However, of these techniques, the scheme using light is hard to achieve size reduction and versatility, and its application purpose is limited. The scheme of sensing the three-dimensional pattern at a fingertip can hardly be put into practical use and is poor in reliability because of special materials and difficulty in working.

A capacitive fingerprint sensor using an LSI manufacturing technology has also been proposed (Marco Tartagni and Roberto Guerrieri, A 390 dpi Live Fingerprint Imager Based on Feedback Capacitive Sensing Scheme, 1997 IEEE International Solid-State Circuits Conference, pp. 200–201 (1997)). In this method, small sensors two-dimensionally arrayed on an LSI chip detect the three-dimensional pattern of a skin using a feedback electrostatic capacitance scheme. For this capacitive sensor, a plate is formed on the uppermost layer of LSI interconnections, and a passivation film is formed thereon.

When a fingertip comes into contact with this sensor, the skin surface functions as a second plate which is spaced apart by an insulating layer formed by air. Sensing is done on the basis of the distance difference between the skin surface and the plate, thereby detecting the fingerprint. In this technique, a reference plate is arranged near the plate on the uppermost layer, and the difference from this reference plate is used for actual sensing. As characteristic features of this structure, no special interface is required, and the size can be reduced, unlike the conventional optical scheme.

In principle, the fingerprint sensor has a sensor electrode formed on a semiconductor substrate and a passivation film formed on the sensor electrode, in which the capacitance between the skin and the sensor is detected through the passivation film to detect a small three-dimensional structure.

The conventional capacitive fingerprint sensor will be briefly described with reference to the accompanying drawings. This capacitive sensor has a structure shown in FIG. 10. An interconnection 403 is formed via a lower insulating film 402 on a semiconductor substrate 401 having LSIs formed thereon, and an interlevel insulator 404 is formed thereon.

Sensor electrodes 406 each having, e.g., a rectangular planar shape are formed on the interlevel insulator 404. The sensor electrode 406 is connected to the interconnection 403 through a plug 405 in the through hole formed in the interlevel insulator 404. A passivation film 407 is formed on the interlevel insulator 404 to cover the sensor electrodes 406, thereby forming a sensor element. As shown in FIG. 11, a plurality of sensor elements are two-dimensionally arrayed while preventing the sensor electrodes 406 of adjacent sensor elements from coming into contact with each other.

The operation of the capacitive sensor will be described next. To detect a fingerprint, a finger whose fingerprint is to be detected comes into contact with the passivation film 407 first. As the finger comes into contact, the skin in contact with the passivation film 407 on the sensor electrode 406 functions as an electrode, so a capacitance is formed between the skin and the sensor electrode 406. This capacitance is detected through the interconnection 403. The fingerprint at the fingertip is formed by the three-dimensional pattern of the skin. Hence, when the fingertip is brought into contact with the passivation film 407, the distance between the sensor electrode 406 and the skin serving as an electrode changes between the ridge portion and the valley portion of the skin surface. This difference in distance is detected as the difference in capacitance. Hence, the three-dimensional pattern on the skin surface can be obtained by detecting the distribution of capacitance that changes between the sensor electrodes. Thus, the small three-dimensional pattern on the skin can be sensed by this capacitive sensor.

Such a capacitive fingerprint sensor requires no special interface and enables size reduction, unlike the conventional optical sensor.

This capacitive sensor can be integrally mounted on an integrated circuit (LSI) chip which integrates the following sections. More specifically, the above-described capacitive sensor can be mounted on an integrated circuit chip which integrates a capacitance detection circuit for detecting the capacitance of the sensor electrode 406, a processing circuit for receiving and processing the output from the capacitance detection circuit, a storage circuit storing fingerprint data for collation, and a comparison/collation circuit for comparing and collating the fingerprint data in the storage circuit with a fingerprint detected by the capacitance detection circuit and processed by the processing circuit. When these units are formed on one integrated circuit chip, information can hardly be altered in data transfer between the units, and security performance can be improved.

A capacitance detection sensor using such an LSI technology is described in, e.g., "ISSCC DIGEST OF TECHNICAL PAPERS" FEBRUARY 1998 pp. 284–285.

FIG. 12 shows a conventional capacitance detection circuit for detecting an electrostatic capacitance formed between finger skin and an electrode to detect the three-dimensional pattern on the skin surface. Referring to FIG. 12, a detection element 50 outputs, as a voltage signal, a value Cf of electrostatic capacitance formed between the sensor electrode 406 and a surface 400 of a finger in contact. A capacitance detection circuit 500 comprises a signal generation circuit 510 and output circuit 520. The sensor electrode 406 of the detection element 50 is connected to the input side of a current source 511 of a current I through an NMOS transistor Q2. A node N1 between the sensor electrode 406 and the transistor Q2 is connected to the input side of the output circuit 520. A power supply voltage VDD is applied to the node N1 through a PMOS transistor Q1. The node N1 has a parasitic capacitance Cp0. Signals $\overline{PRE}$ and RE are supplied to the gate terminals of the transistors Q1 and Q2, respectively.

The current source 511 and transistor Q2 constitute the signal generation circuit 510, and an NMOS transistor Q3 and bias resistance Ra constitute the output circuit 520.

The operation of the capacitance detection circuit 500 shown in FIG. 12 will be described.

First, the signal $\overline{PRE}$ of high level (VDD) is supplied to the gate terminal of the transistor Q1 while the signal RE of low level (GND) is supplied to the gate terminal of the transistor Q2. Hence, the transistors Q1 and Q2 are not ON.

In this state, when the signal $\overline{PRE}$ changes from high level to low level, the transistor Q1 is turned on. Since the transistor Q2 is kept OFF, the potential at the node N1 is precharged to VDD.

After completion of precharge, the signal $\overline{PRE}$ changes to high level, and simultaneously, the signal RE changes to high level. The transistor Q1 is turned off, and the transistor Q2 is turned on. Charges stored at the node N1 are removed by the current source 511. As a result, the potential at the node N1 drops.

Let Δt be the period in which the signal RE is kept at high level. A potential drop ΔV at the node N1 after the elapse of period Δt is given by $$\Delta V = I \Delta t / (Cf + Cp0) \quad (1)$$

where Cf is the electrostatic capacitance value.

Since the current I of the current source 511, the period Δt, and the parasitic capacitance Cp0 have predetermined values, the potential drop ΔV is determined by the electrostatic capacitance value Cf. The capacitance value Cf is determined by the distance between the sensor electrode 406 and the finger surface 400 and therefore changes depending on the three-dimensional pattern on the skin surface. This potential drop ΔV is supplied to the output circuit 520 as an input signal. The output circuit 520 receives the potential drop ΔV and outputs a signal that reflects the three-dimensional pattern on the skin surface.

However, the above-described capacitive sensor uses the finger skin as an electrode. For this reason, if a finger with static electricity comes into contact with the sensor, the LSI integrated with the capacitive sensor readily electrostatically break due to this static electricity, resulting in degradation in reliability.

More specifically, a MOS transistor of an LSI normally has characteristics representing that a signal is highly sensitively output in response to a signal input to the gate terminal. For this reason, in the conventional capacitance detection circuit 500, the gate terminal of the MOS transistor Q3 of the output circuit 520 is directly connected to the node N1 connected to the sensor electrode 406, thereby highly sensitively detecting the small signal change ΔV at the node and outputting it.

However, the gate oxide film of the MOS transistor is as thin as 10 nm and has a breakdown voltage of about 100 V. If a voltage higher than this breakdown voltage is input to the gate terminal, the gate oxide film breaks to make the MOS transistor inoperable. For this reason, in recognizing a surface shape such as a three-dimensional pattern on a finger by the conventional capacitance detection circuit shown in FIG. 12, if the target recognition object such as a finger has static electricity, the static electricity more than 1,000 V reaches the gate terminal of the MOS transistor Q3 in the output circuit 520 through the sensor electrode 406. Consequently, the transistor Q3 breaks to degrade the reliability.

SUMMARY OF THE INVENTION

It is an object of the present invention to improve the reliability of a surface shape recognition apparatus for recognizing a small surface shape such as a three-dimensional pattern on a finger skin surface using a capacitive sensor.

In order to achieve the above object, according to the present invention, there is provided a surface shape recognition apparatus comprising a plurality of sensor electrodes formed on an interlevel insulator on a substrate and insulated from each other, a passivation film formed on the interlevel insulator to cover an upper surface and side surface of each of the sensor electrodes, the passivation film being formed from a dielectric material, a capacitance detection circuit for, when a target recognition object comes into contact with a surface of the passivation film, detecting an electrostatic capacitance formed between the sensor electrode and a surface of the target recognition object opposing the sensor electrode, and static electricity avoiding means for passing static electricity on the surface of the passivation film.

DESCRIPTION OF THE PREFERRED EMBODIMENTS

The embodiments of the present invention will be described below with reference to the accompanying drawings.

(First Embodiment)

Figure 1:
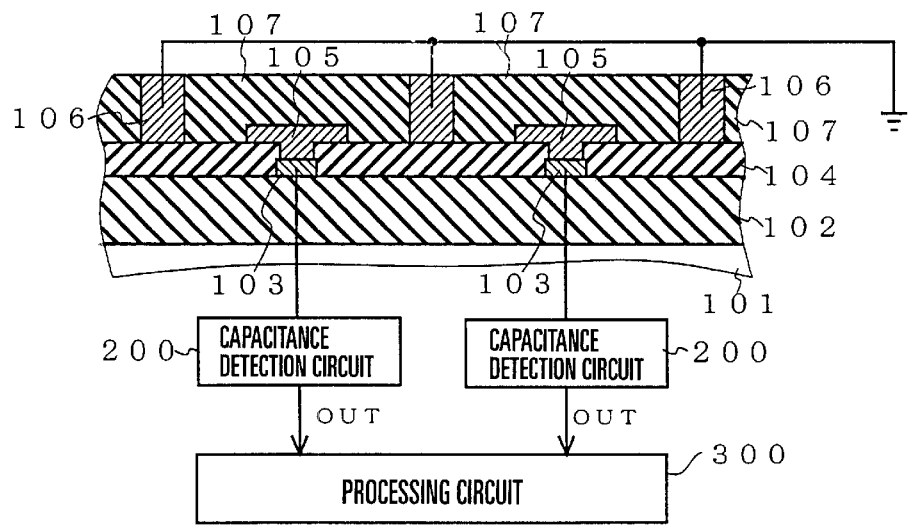
FIG. 1 is a sectional view showing the sensor chip of a surface shape recognition apparatus according to the first embodiment of the present invention.

FIG. 1 shows the main part of a surface shape recognition apparatus according to the first embodiment of the present invention. Referring to FIG. 1, the sensor chip of the surface shape recognition apparatus comprises a plurality of 80-μm square sensor electrodes 105 and a matrix-shaped ground electrode 106 on an interlevel insulator 104 formed on a lower insulating film 102 on a semiconductor substrate 101 formed from, e.g., silicon.

The plurality of sensor electrodes 105 and ground electrode 106 are formed on the same plane defined by the surface of the interlevel insulator 104. The ground electrode 106 need not be flush with the sensor electrodes 105.

Figure 2:
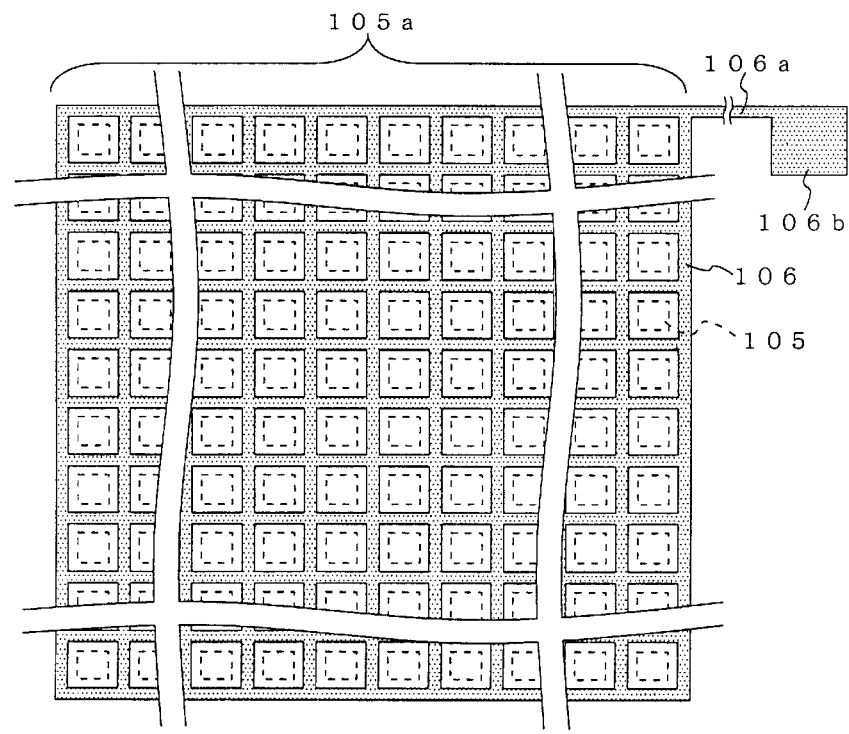
FIG. 2 is a plan view of the sensor chip.

As shown in FIG. 2, the sensor electrodes 105 are arranged at the centers of cells of the matrix formed by the ground electrode 106, and the ground electrode 106 is insulated from the sensor electrodes 105. The ground electrode 106 is formed from, e.g., Au, and has a height, i.e., film thickness of about 3 μm from the bottom portion in contact with the interlevel insulator 104 to the top portion exposed to the surface of a passivation film 107. Hence, the passivation film 107 also has a film thickness of about 3 μm. The upper surface of the ground electrode 106 forms one surface together with the surface of the passivation film 107. In this embodiment, this surface forms one plane.

The ground electrode 106 is connected, through an interconnection 106a formed on the interlevel insulator 104, to a pad (reference electrode) 106b connected to a ground line. In a detection region 105a where the sensor electrodes 105 are formed, the ground electrode 106 is present only on the interlevel insulator 104. In this embodiment, the ground electrode 106 is formed in contact with the upper surface of the interlevel insulator 104. However, the present invention is not limited to this. The ground electrode 106 may be buried from the surface of the passivation film 107, and the bottom portion of the ground electrode 106 may be separated from the upper surface of the interlevel insulator 104. Instead of connecting the pad 106b to the ground line, a predetermined fixed potential may be applied to the pad 106b.

The plurality of sensor electrodes 105 are formed at an interval of 150 μm while being covered with the passivation film 107 formed on the interlevel insulator 104. The sensor electrodes 105 are formed from, e.g., Au and have a film thickness of about 1 μm. Since the film thickness of the passivation film 107 is about 3 μm, the thickness of the passivation film 107 on each sensor electrode 105 is about 2 μm (=3−1). The passivation film 107 is formed from an insulating material such as polyimide having a relative permittivity of about 4.0.

An interconnection 103 is formed on the lower insulating film 102 and connected to the sensor electrode 105 via a through hole. A capacitance detection circuit 200 for detecting a capacitance formed between the sensor electrode 105 and a finger in contact with the sensor is formed on the semiconductor substrate 101. The capacitance detection circuit 200 is connected to the sensor electrode 105 through the above-described interconnection 103. A capacitance detection circuit 200 is prepared for each sensor electrode 105 to detect a capacitance formed between the sensor electrode 105 and a portion of a target recognition object.

An output OUT from each capacitance detection circuit 200 is processed by a processing circuit 300. The processing by the processing circuit 300 generates image data corresponding to a halftone image converted from the electrostatic capacitance (i.e., the three-dimensional pattern (to be described later) of the finger skin surface, which represents the finger surface shape) between each sensor electrode 105 and the finger skin surface as a target recognition object.

The capacitance detection circuits 200 and processing circuit 300 are formed on the semiconductor substrate 101 under the sensor electrodes 105 as an integrated circuit. The capacitance detection circuits 200 and processing circuit 300 need not always be monolithically formed on the semiconductor substrate 101. However, the sensor electrodes 105, capacitance detection circuits 200, and processing circuit 300 are preferably formed as close as possible.

In the first embodiment, the ground electrode 106 is formed to be partially exposed to the surface of the passivation film 107 which comes into contact with a finger to be recognized for recognition. With this arrangement, static electricity generated when the finger comes into contact with the surface of the passivation film 107 flows to the ground electrode 106, so static electricity application to the capacitance detection circuits 200 formed under the interlevel insulator 104 can be suppressed. Since the capacitance detection circuit 200 is hardly affected by the static electricity because of the ground electrode 106, the reliability of the capacitance detection circuit is improved.

(Second Embodiment)

Figure 3:
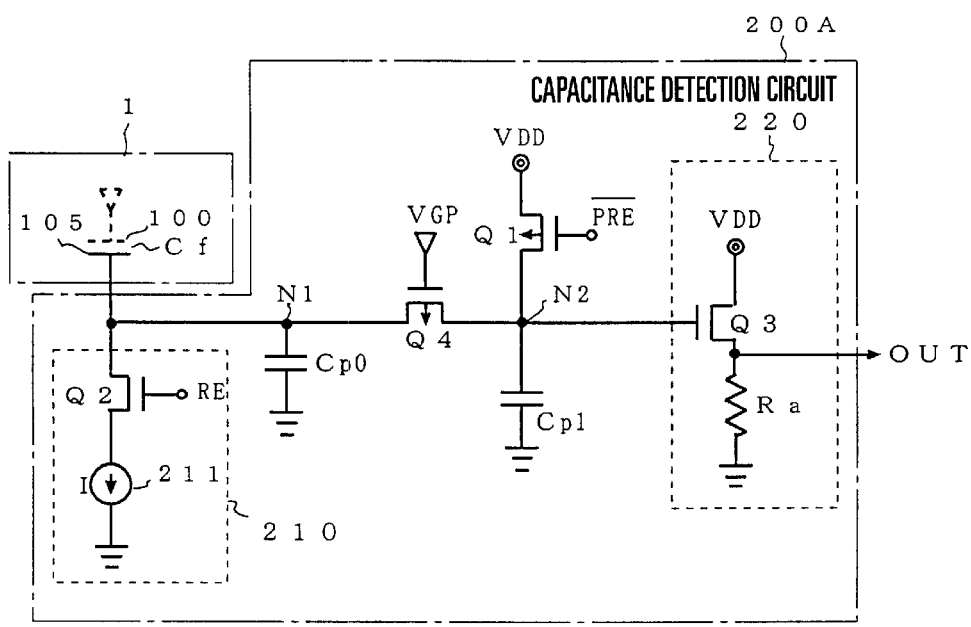
FIG. 3 is a circuit diagram showing a capacitance detection circuit according to the second embodiment of the present invention.

FIG. 3 shows the capacitance detection circuit of a surface shape recognition apparatus according to the second embodiment.

A capacitance detection circuit 200A for detecting an electrostatic capacitance between a sensor electrode 105 and a target recognition object 100 such as a human finger in contact comprises a signal generation circuit 210 for generating a signal according to the quantity of electricity corresponding to a detected electrostatic capacitance value Cf, and an output circuit 220 for detecting the signal at the connection point between the sensor electrode 105 and the signal generation circuit 210 and outputting the signal.

Referring to FIG. 3, the sensor electrode 105 constructing a detection element 1 is connected to the drain terminal of an NMOS transistor Q2 in the signal generation circuit 210. The source terminal of the transistor Q2 is connected to the input side of a current source 211 having a current value I. A node N1 between the sensor electrode 105 and the transistor Q2 is connected to the source terminal of a PMOS transistor Q4. The drain terminal of the transistor Q4 is connected to the drain terminal of a PMOS transistor Q1 having a source terminal to which a power supply voltage VDD is applied, and the input side of the output circuit 220. An NMOS transistor Q3 and bias resistance Ra constitute the output circuit 220. Reference symbols Cp0 and Cp1 denote parasitic capacitances. The elements including the transistors are formed on a semiconductor substrate 101 under a lower insulating film 102 shown in FIG. 1. The elements including the transistors are connected through an interconnection layer on the lower insulating film 102 to form the capacitance detection circuit.

The operation of the capacitance detection circuit 200A having the above arrangement will be described.

In the standby state, a signal $\overline{PRE}$ of high level (VDD) is supplied to the gate terminal of the transistor Q1 shown in FIG. 3 while a signal RE of low level (GND) is supplied to the gate terminal of the transistor Q2. Δt this time, both the transistors Q1 and Q2 are OFF. A potential VGP is applied to the gate terminal of the transistor Q4 to turn on the transistor Q4.

When the signal $\overline{\text{PRE}}$ changes from high level to low level, the transistor Q1 is turned on. Since the transistor Q2 is kept OFF, and therefore, the signal generation circuit 210 is in an inoperative state, a node N2 is precharged to VDD. The node N1 is also precharged to VDD through the transistor Q4. After precharge, the signal $\overline{\text{PRE}}$ is changed from low level to high level to turn off the transistor Q1. Simultaneously, the signal RE is changed from low level to high level to turn on the transistor Q2. The signal generation circuit 210 operates, and charges stored at the nodes N1 and N2 are removed by the current source 211 in the signal generation circuit 210, so the potential at the nodes N1 an N2 lowers.

Let Δt be the period in which the signal RE is maintained at high level. A voltage drop ΔV at the nodes N1 and N2 after the elapse of period Δt is given by $$\Delta V = I \cdot \Delta t / (Cf + Cp0 + Cp1) \quad (2)$$

where Cf is the electrostatic capacitance value, Cp0 and Cp1 are the parasitic capacitance values, and I is the current value of the current source 211.

The electrostatic capacitance Cf is determined by the distance between the finger skin 100 and the sensor electrode 105 and therefore changes depending on the three-dimensional pattern on the skin surface. Since the current value I and the values Cp0 and Cp1 have predetermined values, the voltage drop ΔV represented by equation (2) changes depending on the three-dimensional pattern on the skin surface. This voltage drop ΔV is supplied to the output circuit 220 as an input signal. The output circuit 220 receives the voltage drop ΔV and outputs a signal that reflects the three-dimensional pattern on the skin surface.

Figure 4:
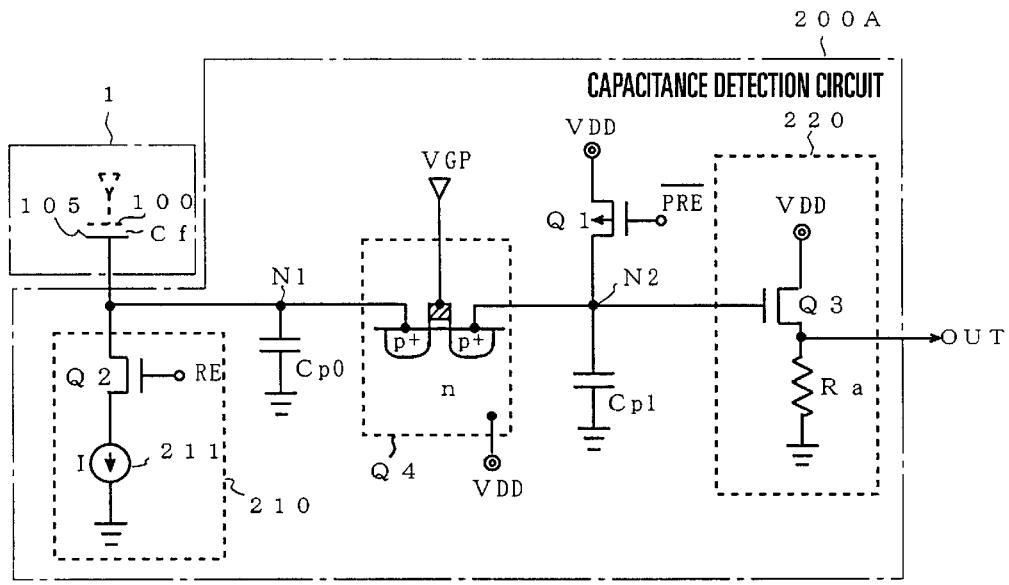
FIG. 4 is a circuit diagram showing the arrangement of the main part of the capacitance detection circuit shown in FIG. 3.

In the capacitance detection circuit shown in FIG. 3, the source terminal of the transistor Q4 is connected to the sensor electrode 105 of the detection element 1 as an input terminal. FIG. 4 schematically shows the sectional structure of the transistor Q4 portion in the capacitance detection circuit shown in FIG. 3.

Figure 5:
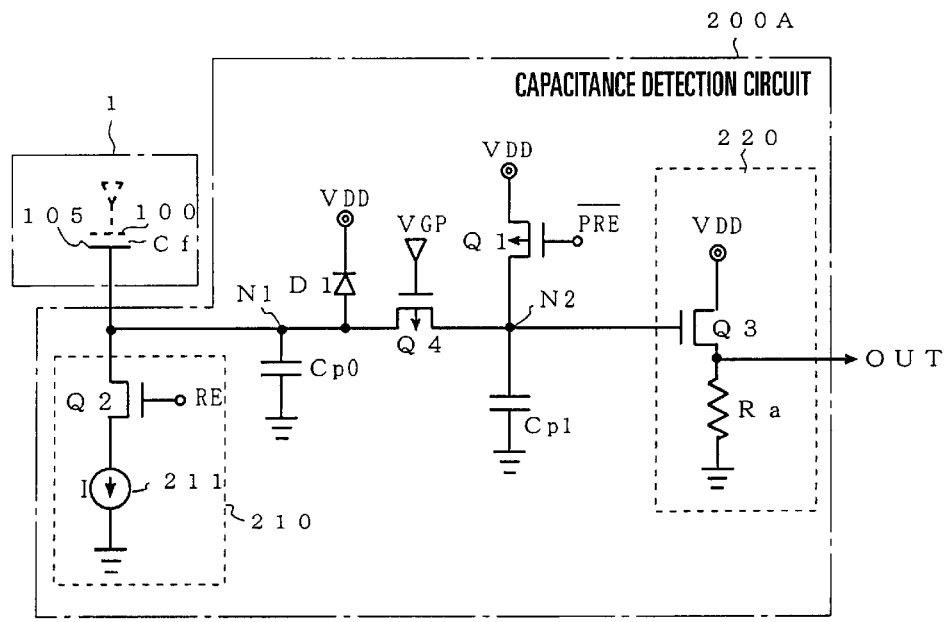
FIG. 5 is a circuit diagram showing the equivalent circuit of the capacitance detection circuit shown in FIG. 4.

Referring to FIG. 4, a power supply having the voltage VGP is connected to the gate of the transistor Q4. The nodes N1 and N2 are connected to the source and drain terminals of the transistor Q4, respectively. The source and drain terminals of the transistor Q4 have a conductivity type p+ as a semiconductor while the substrate (or well) has a conductivity type n. This means a parasitic p-n diode is connected to the node N1. In addition, since the n-type substrate (or well) is connected to the power supply voltage VDD, the parasitic p-n diode is connected to the node N1 as a diode D1, as shown in FIG. 5.

For this reason, even when a high voltage is applied to the node N1, the diode D1 is turned on and functions as a protection circuit. The p-n junction has a sufficiently high breakdown voltage relative to the gate oxide film. For this reason, even when a high negative voltage is applied to the node N1, the transistor Q4 does not break.

Figure 12:
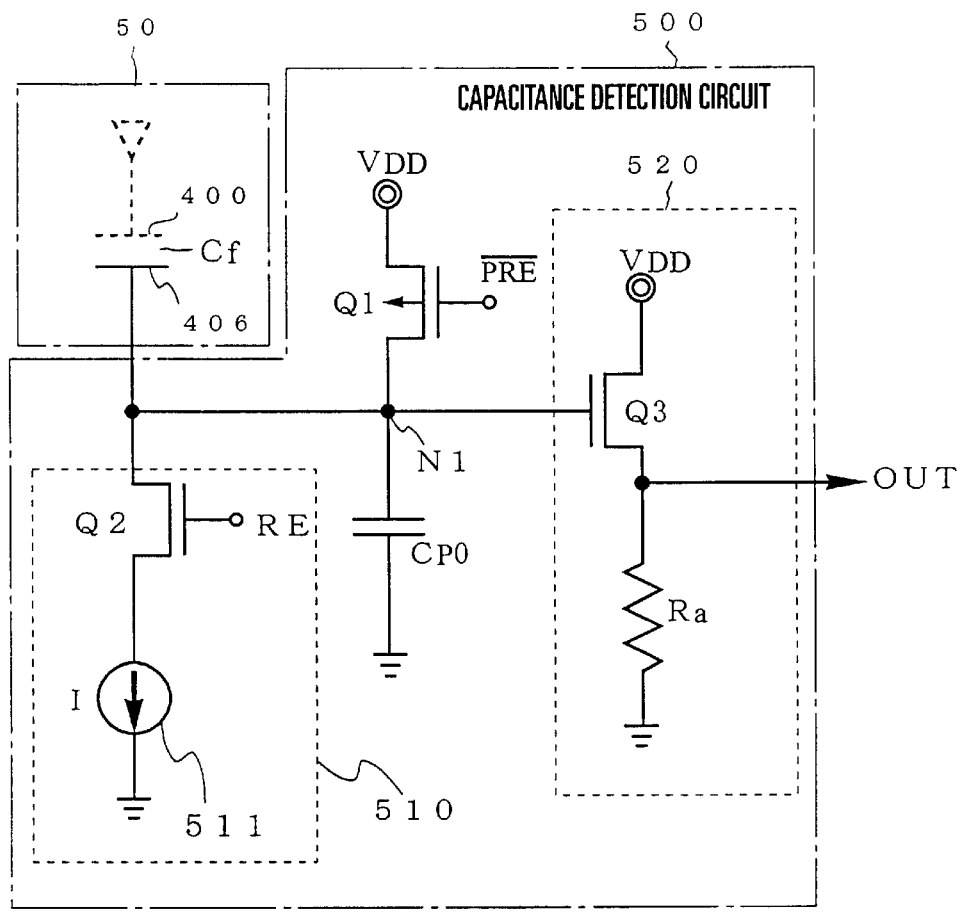
FIG. 12 is a circuit diagram of a conventional capacitance detection circuit.

As described above, the PMOS transistor Q4 is connected to the sensor electrode 105 of the detection element 1 in place of the gate terminal of a MOS transistor, thereby forming the parasitic p-n diode between the substrate and the source terminal. This diode raises the breakdown voltage at the node N1 and functions as a protection circuit against high voltage application. Hence, even when a finger with static electricity comes into the contact, the transistor Q3 does not break, so the reliability of a processing circuit 300 including the capacitance detection circuit 200A is improved, unlike the conventional capacitance detection circuit shown in FIG. 12 in which the high-voltage static electricity reaches the gate terminal of the MOS transistor Q3 in the output circuit 220 through the sensor electrode 105 to break the transistor Q3.

In the second embodiment, the source terminal of the PMOS transistor Q4 is connected to the sensor electrode 105 of the detection element 1. Generally, the source of a MOS transistor has the same characteristics as those of the drain. Hence, even when the drain terminal of the PMOS transistor Q4 is connected to the sensor electrode 105, a parasitic p-n diode is formed between the substrate and the drain terminal. This diode also raises the breakdown voltage at the node N1 and functions as a protection circuit against high voltage application.

The arrangements of the signal generation circuit 210 and output circuit 220 in the capacitance detection circuit 200A shown in FIGS. 3 to 5 are merely implementation examples and are not limited to those shown in FIGS. 3 to 5.

(Third Embodiment)

Figure 6:
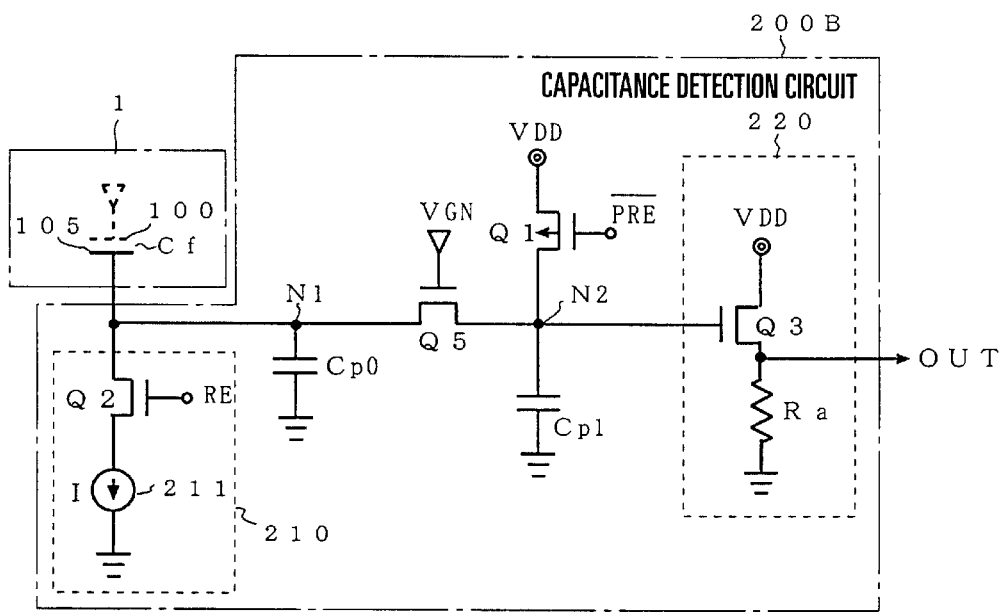
FIG. 6 is a circuit diagram showing a capacitance detection circuit according to the third embodiment of the present invention.

FIG. 6 shows a capacitance detection circuit according to the third embodiment of the present invention. In the second embodiment shown in FIG. 3, the PMOS transistor Q4 is inserted between the sensor electrode 105 and the output circuit 220. In the third embodiment, however, an NMOS transistor Q5 is inserted between a detection element 1 and an output circuit 220.

The operation of a capacitance detection circuit 200B shown in FIG. 6 will be described next.

When a signal $\overline{\text{PRE}}$ changes from high level to low level, a transistor Q1 is turned on. Since a transistor Q2 is kept OFF, a node N2 is precharged to VDD. As a result, a node N1 is precharged to VGN−Vth through the transistor Q5 to turn off the transistor Q5. Reference symbol VGN denotes the potential at the gate terminal of the transistor Q5; and Vth, the threshold voltage Vth of the transistor Q5.

After precharge, the signal $\overline{\text{PRE}}$ is changed from low level to high level to turn off the transistor Q1. Simultaneously, a signal RE is changed from low level to high level to turn on the transistor Q2. A signal generation circuit 210 operates, and charges stored at the node N1 are removed by a current source 211 in the signal generation circuit 210, so the potential at the node N1 slightly lowers. At this time, the transistor Q5 is turned on. Charges stored at the node N2 are also removed by the current source 211, so the potential at the node N2 also becomes low.

A parasitic capacitance value Cp1 mainly includes the parasitic capacitances at the drain terminals of the transistors Q1 and Q5 and gate terminal of a transistor Q3 and can be made sufficiently smaller than a parasitic capacitance Cp0 by actual layout. For this reason, the potential change at the node N2 is larger than that at the node N1. As described above, the transistor Q5 functions as an amplification circuit for amplifying the voltage signal generated by the signal generation circuit 210.

Let Δt be the period in which the signal RE is maintained at high level. A voltage drop ΔV at the node N1 after the elapse of period Δt is given by $$\Delta V = VDD - (VGN - Vth) + I \cdot \Delta t / (Cf + Cp0 + Cp1) \quad (3)$$

where I is the current value of the current source 211.

An electrostatic capacitance value Cf is determined by the distance between a finger skin 100 and the sensor electrode 105 and therefore changes depending on the three-dimensional pattern on the skin surface. Since all values except the electrostatic capacitance value Cf are predetermined, the voltage drop ΔV represented by equation (3) changes depending on the three-dimensional pattern on the skin surface. This voltage drop ΔV is supplied to an output circuit 220 as an input signal. The output circuit 220 receives the voltage drop ΔV and outputs a signal that reflects the three-dimensional pattern on the skin surface.

Figure 7:
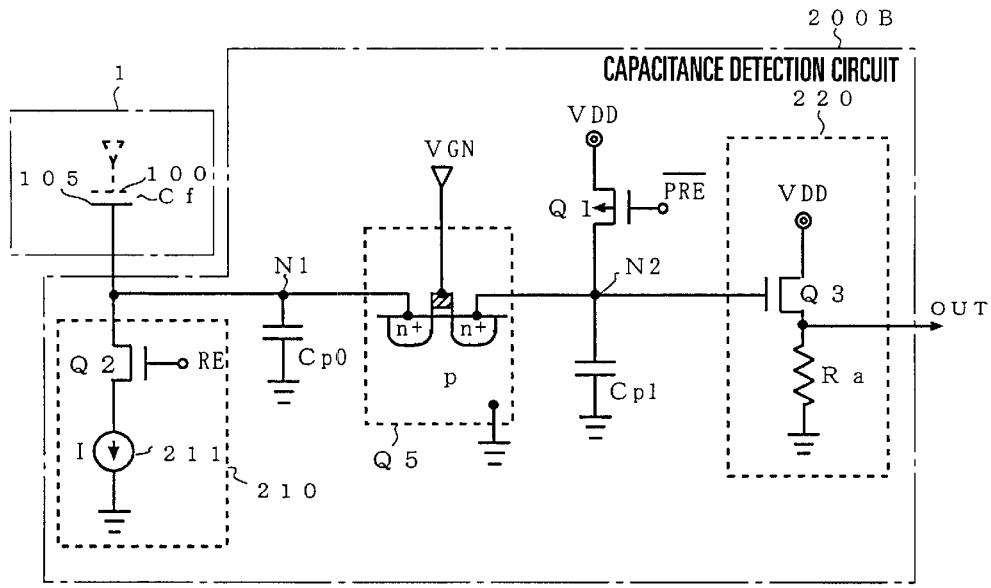
FIG. 7 is a circuit diagram showing the arrangement of the main part of the capacitance detection circuit shown in FIG. 6.

In the capacitance detection circuit 200B shown in FIG. 6, the source terminal of the transistor Q5 is connected to the sensor electrode 105 as an input to the amplification circuit. FIG. 7 schematically shows the sectional structure of the transistor Q5 portion in the capacitance detection circuit 200B shown in FIG. 6.

Figure 8:
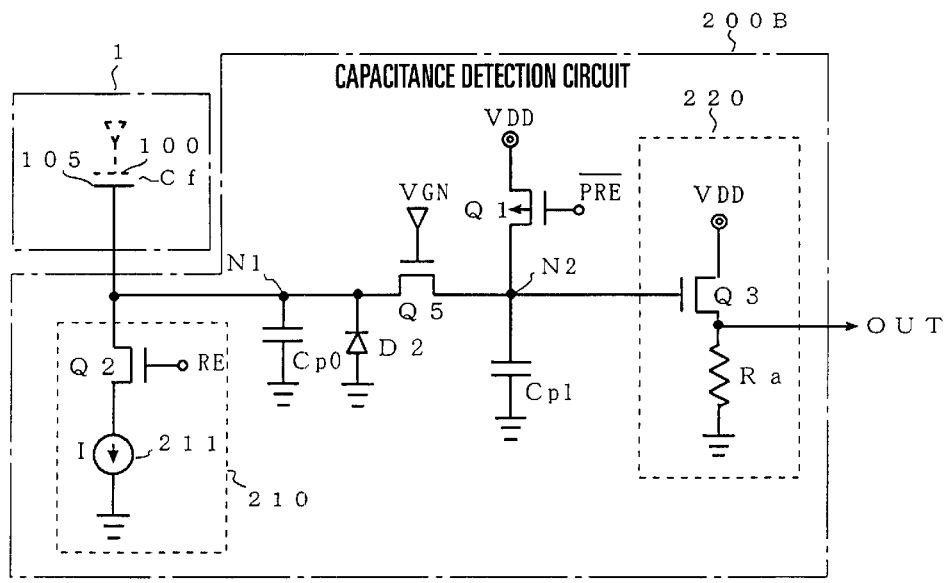
FIG. 8 is a circuit diagram showing the equivalent circuit of the capacitance detection circuit shown in FIG. 7.

Referring to FIG. 7, a power supply with a voltage VGN is connected to the gate terminal of the transistor Q5. The nodes N1 and N2 are connected to the source and drain terminals of the transistor Q5, respectively. The source and drain terminals of the transistor Q5 have a conductivity type n+ as a semiconductor while the substrate (or well) has a conductivity type p. This means a parasitic p-n diode is connected to the node N1. In addition, since the p-type substrate (or well) is connected to the ground potential, the parasitic p-n diode is connected to the node N1 as a diode D2, as shown in FIG. 8.

As described above, the p-n junction has a sufficiently high breakdown voltage relative to the gate oxide film. For this reason, in the capacitance detection circuit of the third embodiment, even when a high voltage is applied to the node N1, the transistor Q5 does not break. When a high negative voltage is applied to the node N1, the diode D2 is turned on and functions as a protection circuit.

As described above, the source terminal of the NMOS transistor Q5 is connected to the sensor electrode 105 of the detection element 1 in place of the gate terminal of a MOS transistor, thereby forming the parasitic p-n diode between the substrate and the source terminal. This diode raises the breakdown voltage at the node N1 and functions as a protection circuit against a negative voltage. Hence, even when a finger with static electricity comes into the contact with the sensor, the transistor Q3 does not break, so the reliability of a processing circuit 300 including the capacitance detection circuit 200B is improved, unlike the conventional capacitance detection circuit shown in FIG. 12 in which the high-voltage static electricity reaches the gate terminal of the MOS transistor Q3 in the output circuit 220 through the sensor electrode 105 to break the transistor Q3.

In the third embodiment, the source terminal of the NMOS transistor Q5 is connected to the sensor electrode 105 of the detection element 1. Generally, the source of a MOS transistor has the same characteristics as those of the drain. Hence, even when the drain terminal of the NMOS transistor Q5 is connected to the sensor electrode 105, a parasitic p-n diode is formed between the substrate and the drain terminal. This diode also raises the breakdown voltage at the node N1 and functions as a protection circuit against a negative voltage.

In addition, since the transistor Q5 has an amplification function, an amplification circuit having a protection circuit can be implemented without increasing the number of elements, unlike the capacitance detection circuit of the second embodiment. Hence, a compact capacitance detection circuit having a higher detection sensitivity can be constructed at low cost.

The arrangements of the signal generation circuit 210 and output circuit 220 in the capacitance detection circuit 200B shown in FIGS. 6 to 8 are merely implementation examples and are not limited to those shown in FIGS. 6 to 8.

(Fourth Embodiment)

Although not illustrated, a capacitance detection circuit of the fourth embodiment has an arrangement in which the polarities of the transistors and signals in the capacitance detection circuit 200A of the second embodiment shown in FIG. 3 are inverted, and the ground (GND) potential and power supply voltage VDD shown in FIG. 3 are exchanged.

With this arrangement, the same effect as that of the capacitance detection circuit 200A of the second embodiment can be obtained.

(Fifth Embodiment)

Although not illustrated, a capacitance detection circuit of the fifth embodiment has an arrangement in which the polarities of the transistors and signals in the capacitance detection circuit 200B of the third embodiment shown in FIG. 6 are inverted, and the ground (GND) potential and power supply voltage VDD shown in FIG. 6 are exchanged.

With this arrangement, the same effect as that of the capacitance detection circuit 200B of the third embodiment can be obtained.

(Sixth Embodiment)

Figure 9:
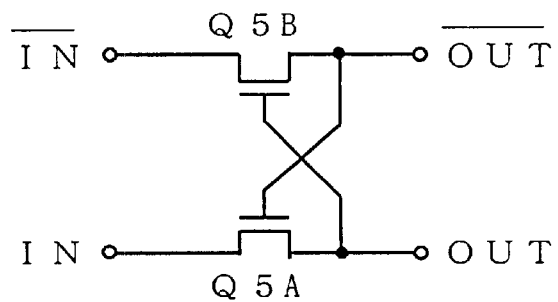
FIG. 9 is a circuit diagram showing a capacitance detection circuit according to the sixth embodiment of the present invention.
Figure 10:
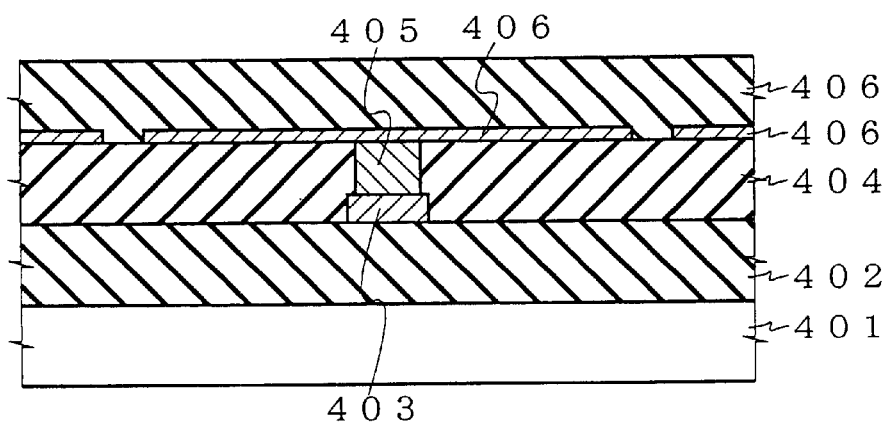
FIG. 10 is a sectional view of a conventional sensor chip.
Figure 11:
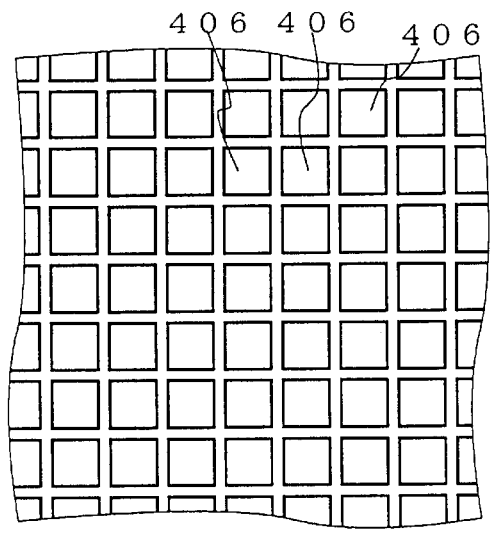
FIG. 11 is a plan view of the conventional sensor chip.

A capacitance detection circuit of the sixth embodiment uses another source-input-type amplification circuit as an amplification circuit. A transistor Q5 shown in FIG. 6, which has an amplification function, is constructed by two transistors Q5A and Q5B, as shown in FIG. 9. The drain terminals and gate terminals of the transistors Q5A and Q5B are cross-connected to make them to function as a differential amplification circuit.

When the source terminals of the transistors Q5A or Q5B shown in FIG. 9 is connected to a sensor electrode 105 as inputs to the differential amplification circuit, the same effect as that of the third and fifth embodiments can be obtained.

As described above, when the source terminal of a MOS transistor is connected to the sensor electrode 105 of a detection element 1 as an input to the input circuit for inputting a signal from the detection element 1 side, a parasitic p-n diode is formed. Since this diode raises the breakdown voltage and functions as a protection circuit, the reliability of a capacitance detection circuit 200 is improved. Hence, when this surface shape recognition apparatus is applied as a fingerprint detection apparatus using an LSI manufacturing technology, the apparatus can be prevented from breaking even when a finger has static electricity, so the reliability of the surface shape recognition apparatus is improved.

As has been described above, according to the present invention, a ground electrode is formed on the apparatus surface. The ground electrode and interconnections connected thereto are not laid out in the apparatus. In this arrangement, a current generated on the apparatus surface when a target recognition object such as a human finger with static electricity comes into contact with the apparatus surface flows not to the apparatus but to the ground side through the ground electrode. This suppresses the influence of static electricity on the capacitance detection circuit in the apparatus. Hence, the reliability of the apparatus can be improved, and the surface shape of the target recognition object in contact with the apparatus surface can be stably and highly sensitively detected.

In addition, since a static electricity protection element is arranged on the input side of all circuits in the capacitance detection circuit connected to the sensor electrode for detecting the target recognition object, the capacitance detection circuit can be prevented from breaking due to the static electricity.

What is claimed is:

1. A surface shape recognition apparatus comprising:

a plurality of sensor electrodes formed on an interlevel insulator on a substrate and insulated from each other;

a passivation film formed on said interlevel insulator to cover an upper surface and side surface of each of said sensor electrodes, said passivation film being formed from a dielectric material;

a capacitance detection circuit for, when a target recognition object comes into contact with a surface of said passivation film, detecting an electrostatic capacitance formed between said sensor electrode and a surface of said target recognition object opposing said sensor electrode; and static electricity avoiding means for passing static electricity on the surface of said passivation film, said static electricity avoiding means including a ground electrode formed into a matrix shape, said static electricity avoiding means comprises a ground electrode formed on said interlevel insulator to be insulated from said sensor electrodes and partially forming one surface together with said passivation film, and a static electricity protection element inserted between said capacitance detection circuit and said sensor electrode, wherein said plurality of sensor electrodes are arranged at centers of cells of said ground electrode formed into the matrix shape and each of said sensor electrodes is formed into a size with which a plurality of sensor electrodes are covered with a contact surface of said target recognition object in contact with the surface of said passivation film, said capacitance detection circuit is formed under said interlevel insulator on said substrate and said capacitance detection circuit comprises a signal generation circuit connected to said sensor electrode to generate a signal corresponding to the electrostatic capacitance and an output circuit for receiving a signal generated at a connection portion between said sensor electrode and said signal generation circuit, converting the signal into a desired signal, and outputting the desired signal, and said static electricity avoiding means is provided as a static electrictity protection element on an input side of all circuits connected to said sensor electrode, said ground electrode is connected to a reference electrode to which a predetermined potential is applied outside a region where said sensor electrodes are laid out and said ground electrode partially forms one surface together with said passivation film.

2. An apparatus according to claim 1, wherein said static electricity protection element comprises a MOS transistor having one of source and drain terminals connected to said sensor electrode, and a parasitic p-n diode is formed between said one terminal of said MOS transistor and a substrate or well on which said MOS transistor is formed.

3. A surface shape recognition apparatus comprising:

a plurality of sensor electrodes formed on an interlevel insulator on a substrate and insulated from each other;

a passivation film formed on said interlevel insulator to cover an upper surface and side surface of each of said sensor electrodes, said passivation film being formed from a dielectric material;

a capacitance detection circuit for, when a target recognition object comes into contact with a surface of said passivation film, detecting an electrostatic capacitance formed between said sensor electrode and a surface of said target recognition object opposing said sensor electrode, each of said sensor electrodes is formed into a size with which a plurality of sensor electrodes are covered with a contact surface of said target recognition object in contact with the surface of said passivation film, said capacitance detection circuit is formed under said interlevel insulator on said substrate, said capacitance detection circuit comprises a signal generation circuit connected to said sensor electrode to generate a signal corresponding to the electrostatic capacitance, a signal amplification circuit for amplifying a signal generated at a connection portion between said sensor electrode and said signal generation circuit, and an output circuit for converting the signal from said signal amplification circuit into a desired signal and outputting the desired signal, and said static electricity avoiding means is included in an input to said signal amplification circuit connected to said sensor electrode, and said ground electrode is connected to a reference electrode to which a predetermined potential is applied outside a region where said sensor electrodes are laid out, said ground electrode partially forms one surface together with said passivation film; and static electricity avoiding means for passing static electricity on the surface of said passivation film, said static electricity avoiding means including a ground electrode formed into a matrix shape, said static electricity avoiding means comprises a ground electrode formed on said interlevel insulator to be insulated from said sensor electrodes and partially forming one surface together with said passivation film, and a static electricity protection element inserted between said capacitance detection circuit and said sensor electrode, wherein said plurality of sensor electrodes are arranged at centers of cells of said ground electrode formed into the matrix shape.

4. An apparatus according to claim 3, wherein said signal amplification circuit comprises a MOS transistor having one of source and drain terminals connected to said sensor electrode as an input, and a parasitic p-n diode is formed between said one terminal of said MOS transistor and a substrate or well on which said MOS transistor is formed.

5. A surface shape recognition apparatus comprising:

a plurality of sensor electrodes formed on an interlevel insulator on a substrate and insulated from each other, each of said sensor electrodes is formed into a size with which a plurality of sensor electrodes are covered with a contact surface of said target recognition object in contact with the surface of said passivation film, said capacitance detection circuit is formed under said interlevel insulator on said substrate, and said ground electrode is connected to a reference electrode to which a predetermined potential is applied outside a region where said sensor electrodes are laid out;

a passivation film formed on said interlevel insulator to cover an upper surface and side surface of each of said sensor electrodes, said passivation film being formed from a dielectric material;

a capacitance detection circuit for, when a target recognition object comes into contact with a surface of said passivation film, detecting an electrostatic capacitance formed between said sensor electrode and a surface of said target recognition object opposing said sensor electrode, and static electricity avoiding means for passing static electricity on the surface of said passivation film, said static electricity avoiding means including a ground electrode formed into a matrix shape, said ground electrode partially forms one surface together with said passivation film, wherein said static electricity avoiding means comprises a ground electrode formed on said interlevel insulator to be insulated from said sensor electrodes and partially forming one surface together with said passivation film, and a static electricity protection element inserted between said capacitance detection circuit and said sensor electrode, wherein said plurality of sensor electrodes are arranged at centers of cells of said ground electrode formed into the matrix shape and said capacitance detection circuit comprises a signal generation circuit connected to said sensor electrode to generate a signal corresponding to the electrostatic capacitance and an output circuit for receiving a signal generated at a connection portion between said sensor electrode and said signal generation circuit, converting the signal into a desired signal, and outputting the desired signal, and said static electricity avoiding means is provided as a static electricity protection element between said sensor electrode and said output circuit.

6. An apparatus according to claim 5, wherein said static electricity protection element comprises a MOS transistor having one of source and drain terminals connected to said sensor electrode and the other of source and drain terminals connected to an input side of said output circuit, and a parasitic p-n diode is formed between said one terminal of said MOS transistor and a substrate or well on which said MOS transistor is formed.

* * * * *